(12) United States Patent
Cha

(10) Patent No.: US 8,691,426 B2
(45) Date of Patent: Apr. 8, 2014

(54) SECONDARY BATTERY HAVING A WALL WITH VARYING THICKNESSES

(75) Inventor: Sungyoup Cha, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 659 days.

(21) Appl. No.: 12/703,058

(22) Filed: Feb. 9, 2010

(65) Prior Publication Data

US 2010/0248015 A1 Sep. 30, 2010

Related U.S. Application Data

(60) Provisional application No. 61/163,364, filed on Mar. 25, 2009.

(51) Int. Cl.
*H01M 2/02* (2006.01)
*H01M 2/04* (2006.01)
(52) U.S. Cl.
USPC .......................... 429/176; 429/163
(58) Field of Classification Search
USPC ................................. 429/163, 176
See application file for complete search history.

(56) References Cited

U.S. PATENT DOCUMENTS

| | | | |
|---|---|---|---|
| 2,199,229 A | 4/1940 | Smith | |
| 2,385,127 A | 9/1945 | Carlile | |
| 2,621,221 A | 12/1952 | De Munck | |
| 4,168,350 A | 9/1979 | Oxenreider et al. | |
| 5,556,722 A | 9/1996 | Narukawa et al. | |
| 2003/0003355 A1 | 1/2003 | Ueda et al. | |
| 2005/0136325 A1 | 6/2005 | Fujihara et al. | |
| 2006/0263679 A1 | 11/2006 | Park et al. | |
| 2009/0305128 A1 | 12/2009 | Yeo | |

FOREIGN PATENT DOCUMENTS

| | | |
|---|---|---|
| CN | 1622363 A | 6/2005 |
| EP | 2 133 933 A1 | 12/2009 |
| JP | 2003-208876 A | 7/2003 |
| JP | 2005-158607 | 6/2005 |
| JP | 2006-338992 | 12/2006 |
| JP | 2009-295582 A | 12/2009 |
| KR | 10-2005-0080516 | 8/2005 |
| KR | 10-2006-0027270 A | 3/2006 |
| KR | 10-2006-0086720 A | 8/2006 |
| KR | 10-0624952 B1 | 9/2006 |

OTHER PUBLICATIONS

Machine translation of JP 2006-338992 originally published to Atsumi et al. in Dec. 2006.*
European Search Report dated Jul. 2, 2010, for corresponding European application 10154068.0.

* cited by examiner

*Primary Examiner* — Jonathan G Leong
(74) *Attorney, Agent, or Firm* — Christie, Parker & Hale, LLP

(57) ABSTRACT

A secondary battery including a can having enhanced safety against compression. A secondary battery includes: an electrode assembly; a can containing the electrode assembly and including a plate, and a wall extending from the plate in a first direction to define a cavity and an opening opposite the plate, a portion of the wall being thicker than another portion of the wall; and a cap assembly sealing the electrode assembly in the can.

7 Claims, 5 Drawing Sheets

SECONDARY BATTERY HAVING A WALL WITH VARYING THICKNESSES

CROSS-REFERENCE TO RELATED APPLICATION

This application claims priority to and the benefit of U.S. Provisional Patent Application No. 61/163,364 filed on Mar. 25, 2009, the entire content of which is incorporated herein by reference.

BACKGROUND

1. Field

The present invention relates to a secondary battery.

2. Description of the Related Art

A prismatic type secondary battery includes an electrode assembly in which a positive electrode, a negative electrode, and a separator interposed between the electrodes are wound to have a jelly-roll configuration is accommodated in a can together with an electrolyte, and is finished by sealing a top opening of the can with a cap assembly.

Here, the can is a container formed of a conductive metal and has a box-like shape. The can is formed by a machining method such as deep drawing such that it has a bottom plate and a side wall extending along the bottom plate. The side wall has two wide side walls facing each other and two narrow side walls having a width narrower than that of the wide side walls and facing each other. An existing side wall has the same thickness along its entire sides.

SUMMARY

Embodiments of the present invention provide a secondary battery that is configured to resist compression.

According to one exemplary embodiment, a secondary battery includes: an electrode assembly; a can containing the electrode assembly and including a plate, and a wall extending from the plate in a first direction to define a cavity and an opening opposite the plate, a portion of the wall being thicker than another portion of the wall; and a cap assembly sealing the electrode assembly in the can.

The wall may include first and second walls that face each other and third and fourth walls that face each other, each of the third and fourth walls connecting the first and second walls to each other. Each of the first and second walls may have a planar shape, and each of the third and fourth walls may have a convex shape or a planar shape.

Each of the first and second walls may have an area greater than an area of each of the third and fourth walls. The thicker portion of the wall may include a portion of the third wall extending in the first direction and being proximate the first wall. The thicker portion of the wall further may include a portion of the fourth wall extending in the first direction and being proximate the second wall.

The thicker portion of the wall may further include at least a portion of the first wall proximate the third wall. The thicker portion may further include at least a portion of the second wall proximate the fourth wall and a portion of the fourth wall proximate the second wall.

The thicker portion may include the first wall, the second wall, the fourth wall, and at least a portion of the third wall proximate the first wall.

The thicker portion of the wall may include a first corner portion between the first wall and the third wall, and a second corner portion between the second wall and the fourth wall. Each of the first and second walls may have a planar shape, and each of the third and fourth walls may have a planar shape and be substantially perpendicular to each of the first and second walls.

The thicker portion of the wall may include a portion of the wall protruding inward toward the cavity. The protruding portion of the wall may have at least one rounded edge.

A thickness of the wall may be between about 0.18 mm and about 0.4 mm.

A difference between a thickness of the thicker portion of the wall and a thickness of the another portion of the wall may be at least 0.05 mm.

The thicker portion of the wall may extend in the first direction from the plate to an end proximate the opening.

The wall may include a stepped portion at an end of the thicker portion of the wall proximate the opening, and the cap assembly may be coupled to the can on the stepped portion.

According to embodiments of the present invention, since the thicknesses of two portions of one short side wall of the can are different, a force may be applied mainly to the thinner portion during compression. Accordingly, a secondary battery according to embodiments of the present invention avoids or resists compression as it is rotated, thereby enhancing safety.

BRIEF DESCRIPTION OF THE DRAWINGS

Features and aspects of the present invention will be more apparent from the following detailed description in conjunction with the accompanying drawings, in which.

DETAILED DESCRIPTION

Hereinafter, exemplary embodiments of the present invention will be described in detail with reference to the accompanying drawings.

According to embodiments of the present invention, a secondary battery is configured to resist compression (e.g., longitudinal compression) from the two narrow side walls that is applied to the secondary battery including the existing can to avoid a safety problem such as ignition or explosion due to the electrode assembly being popped out or short-circuited due to deformation of the can.

According to an embodiment of the present invention, a secondary battery includes an electrode assembly, and a can that has a bottom plate and a side wall having first and second wide side walls facing each other, first and second narrow side walls facing each other and that accommodates the electrode assembly. In some embodiments, the thickness of a first wall portion of the first narrow side wall closer to the first wide side wall is asymmetrical to a second wall portion of the first narrow side wall closer to the second wide side wall.

Figure 1:
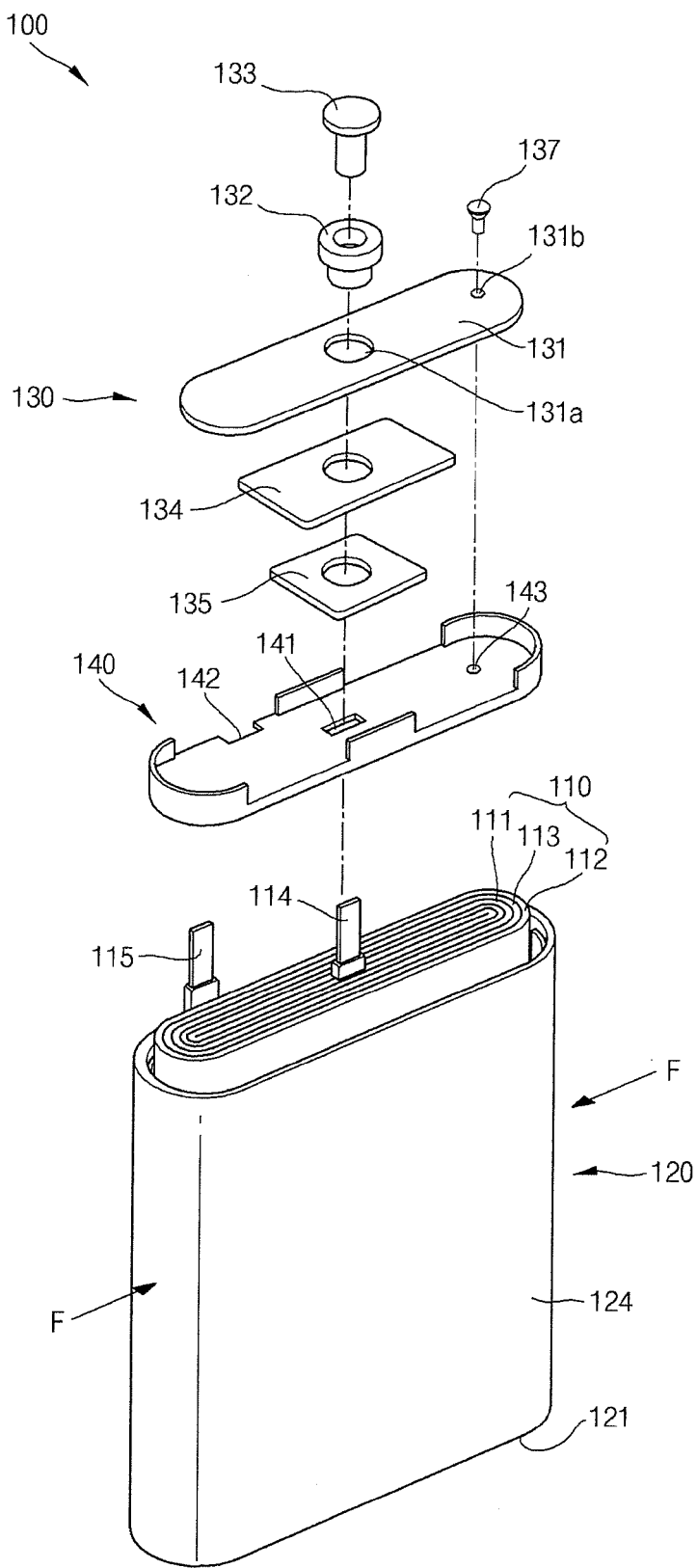
FIG. 1 is an exploded perspective view of a secondary battery according to an exemplary embodiment of the present invention.
Figure 2:
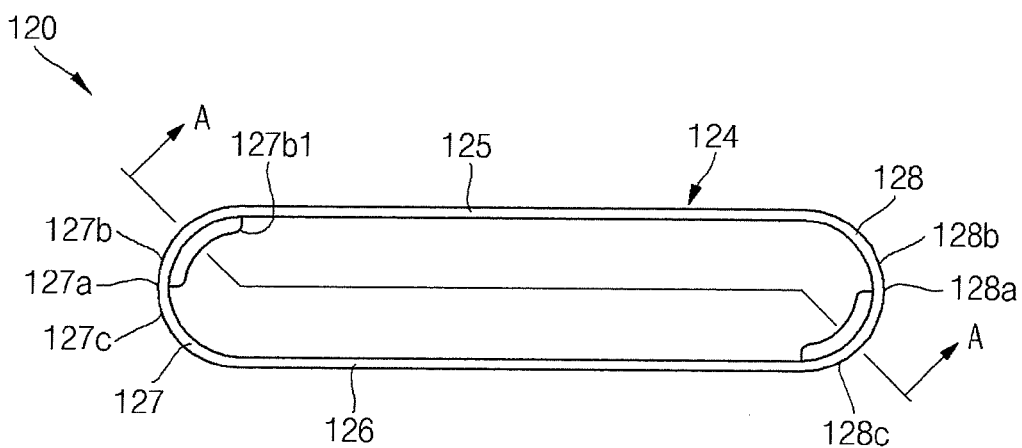
FIG. 2 is a plan view of a can of the secondary battery of FIG. 1.
Figure 3:
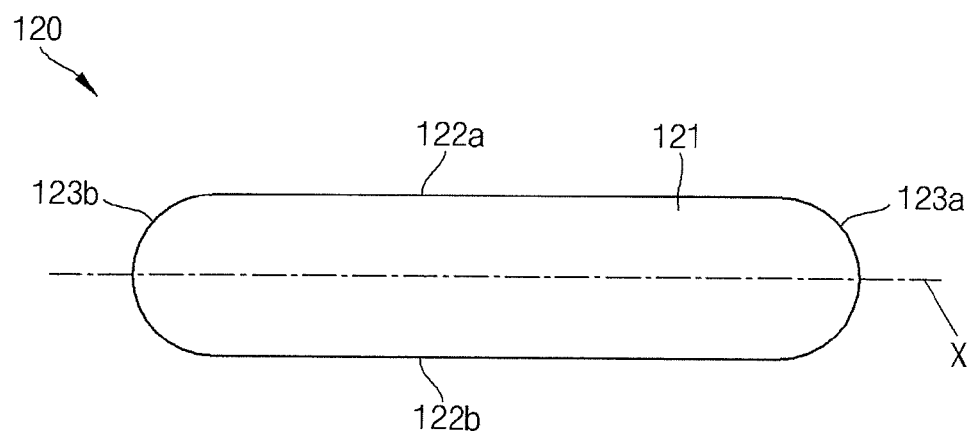
FIG. 3 is a bottom view of the can of FIG. 1.
Figure 4:
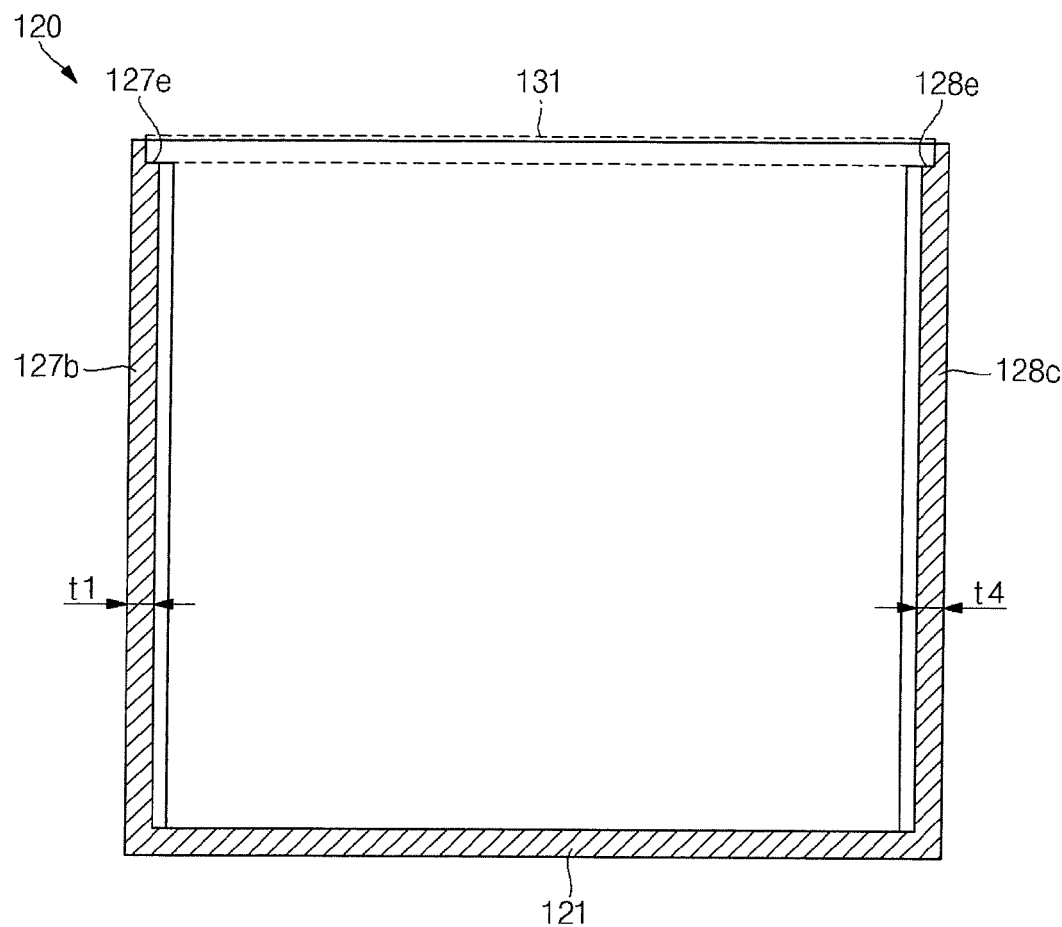
FIG. 4 is a sectional view of the can taken along line A-A of FIG. 2.
Figure 5:
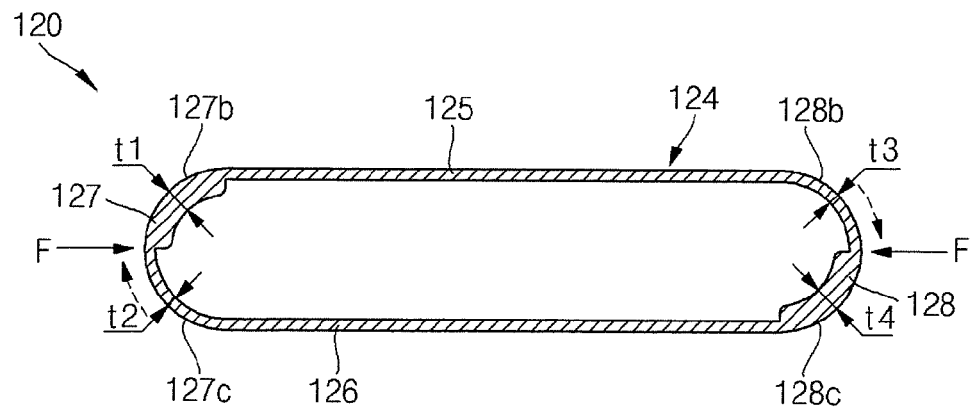
FIG. 5 is a sectional view of the can of FIG. 2 viewed from the top.

FIG. 1 is an exploded perspective view of a secondary battery according to an exemplary embodiment of the present invention. FIG. 2 is a plan view of a can of the secondary battery of FIG. 1. FIG. 3 is a bottom view of the can of FIG. 1. FIG. 4 is a sectional view of the can taken along line A-A of FIG. 2. FIG. 5 is a sectional view of the can of FIG. 2 viewed from the top.

Referring to FIGS. 1-5, a secondary battery 100 according to an exemplary embodiment of the present invention includes an electrode assembly 110, a can 120, a cap assembly 130, and an insulation case 140.

The electrode assembly 110 includes a first electrode plate 111, a second electrode plate 112, and a separator 113 interposed between the electrode plates 111 and 112, which are wound to have a jelly-roll configuration. A first conductive electrode tab 114 is coupled to the first electrode plate 111 and protrudes to the upper side of the electrode assembly 110. A second conductive electrode tab 115 is coupled to the second electrode plate 112 and protrudes to the upper side of the electrode assembly 110. In one embodiment of the present invention, the first electrode plate 111 is a negative electrode plate coated with a negative electrode active material and the second electrode plate 112 is a positive electrode plate coated with a positive electrode active material. However, embodiments of the present invention are not limited thereto. For example, the first electrode plate 111 may be a positive electrode plate and the second electrode plate 112 may be a negative electrode plate. Accordingly, the first electrode tab 114 may be a positive electrode tab and the second electrode tab 115 may be a negative electrode tab.

In some embodiments of the present invention, the two electrode tabs 114 and 115 are made of nickel, but other embodiments of the present invention are not limited thereto.

The can 120 has a bottom plate 121 and a side wall extending upward from the edges of the bottom plate 121. The electrode assembly 110 is received into the can 120 through a top opening of the side wall 124. The can 120 may be formed of a conductive metal such as aluminum, for example, by deep drawing.

In one embodiment, the bottom plate 121 has a bar shape that extends lengthwise along the X-axis extending longitudinally. The bottom plate 121 has a first long edge 122a and a second long edge 122b extending in parallel to each other along the X-axis and two short edges 123a and 123b shorter than the two long edges 122a and 122b and connecting ends of the two long edges 122a and 122b. The two short edges 123a and 123b are rounded such that the centers thereof protrude outward. The bottom plate 121, in one embodiment, has a thickness of 0.2 to 0.7 mm.

The side wall 124 has first and second wide side walls 125 and 126 facing each other and first and second narrow side walls 127 and 128 facing each other and having a width narrower than that of the wide side walls 125 and 126. The side wall 124, in one embodiment, has a thickness of 0.18 to 0.4 mm. If the thickness of the side wall 124 is below 0.18 mm, it may be easily deformed during an assembling process or a size test due to its weak strength, damaging the electrode assembly 110. On the other hand, if the thickness of the side wall 124 is above 0.4 mm, the size of the electrode assembly 110 is reduced, lowering the capacity of the battery itself.

The first wide side wall 125 extends upward from the first long edge 122a of the bottom plate 121 and the second wide side wall 126 extends upward from the second long edge 122b of the bottom plate 121. The first narrow wall 127 extends upward from the first short edge 123a of the bottom plate 121 and the second narrow wall 128 extends upward from the second short edge 123b of the bottom plate 121. The two narrow side walls 127 and 128 connect the two wide side walls 125 and 126 to each other. The two narrow side walls 127 and 128 are rounded such that the centers thereof protrude outward.

The first narrow side wall 127 has a first wall portion 127b closer to the first wide side wall 125 with respect to a first center 127a, i.e. a first protruding end and a second wall portion 127c closer to the second wide side wall 126. At least one portion of the inner wall of the first wall portion 127b protrudes inward, the first wall portion 127b and the second wall portion 127c being asymmetrical to each other. The thickness t1 of the first wall portion 127b is thicker than the thickness t2 of the second wall portion 127c. The thickness t2 of the second wall portion 127c is substantially the same as that of the second wide side wall 126. The protruding corner 127b1 of the first wall portion 127b may be rounded to prevent damage to the electrode assembly 110. The second narrow side wall 128 has a third wall portion 128b closer to the first wide side wall 125 with respect to a second center 128a, i.e. a second protruding end and a fourth wall portion 128c closer to the second wide side wall 126. At least one portion of the inner wall of the first wall portion 127 protrudes inward, the thickness t4 of the fourth wall portion 128c being thicker than the thickness t3 of the third wall portion 128b. The thickness t3 of the third wall portion 128b is substantially the same as that of the first wide side wall 125. Since the first wall portion 127b is thicker than the second wall portion 127c, the first wall portion 127b is structurally reinforced as compared with the second wall portion 127c. Since the fourth wall portion 128c is thicker than the third wall portion 128b, the fourth wall portion 128c is structurally reinforced as compared with the third wall portion 128b. Accordingly, when a longitudinally compressive force F is applied, a greater force, or stress, is applied to the second wall portion 127c than to the first wall portion 127b of the first narrow wall 127 and a greater force, or stress, is applied to the third wall portion 128b than to the fourth wall portion 128c of the second narrow wall 128. The unbalance of the forces rotates the can 120 in the direction of the dotted arrow as illustrated in FIG. 5. Accordingly, the can 120 avoids, or resists, the longitudinal compression, thereby enhancing safety. In one embodiment, the thickness difference t1-t2 between the first wall portion 127b and the second wall portion 127c and the thickness difference t4-t3 between the fourth wall portion 128c and the third wall portion 128b are at least 0.05 mm, which thickness may be preferable. If the thickness differences t1-t2 and t4-t3 are smaller than 0.05 mm, the difference between the forces, or stresses, applied to the first wall portion 127b and the second wall portion 127c and the difference between the forces, or stresses, applied to the fourth wall portion 128c and the third wall portion 128b are not enough to rotate the can 120.

Results of can testing are shown in Table 1 below. The cans tested were allowed to stand vertically and subjected to compression tests with a compression force of 13 kN applied for 2 seconds, followed by removing the compression force applied to the tested cans. Then, the outer appearances of the cans were observed. Table 1 summarizes results of experiments carried out with varying the thickness of a second wall portion of the wall portions.

TABLE 1

|  | first wall portion | second wall portion | third wall portion | fourth wall portion | pass | fail |
|---|---|---|---|---|---|---|
| Test 1 | 0.40 mm | 0.2 mm | 0.40 mm | 0.40 mm | 10 units | 0 units |
| Test 2 | 0.40 mm | 0.35 mm | 0.40 mm | 0.40 mm | 10 units | 0 units |
| Test 3 | 0.40 mm | 0.36 mm | 0.40 mm | 0.40 mm | 8 units | 2 units |
| Test 4 | 0.40 mm | 0.38 mm | 0.40 mm | 0.40 mm | 8 units | 2 units |
| Test 5 | 0.40 mm | 0.40 mm | 0.40 mm | 0.40 mm | 8 units | 2 units |

As shown in Table 1, particularly in Tests 3-5, when a difference in the thickness between the second wall portion and another wall portion is less than or equal to 0.04 mm, only 8 of 10 samples were determined as "pass" and 2 samples as "fail." In Tests 1 and 2, when the thickness difference between the second wall portion and another wall portion is at least 0.05 mm, all of 10 test samples were determined as "pass." Thus, Table 1 shows a greater passing rate in an embodiment having a thickness difference between the second wall portion and another wall portion of greater than or equal to 0.05 mm.

The term "fail" used herein means to indicate that a quality problem occurred to a can. That is to say, with a compression force applied in a long axis, flames were created to heat the can, resulting in a rise of the internal temperature to about 200° C. or higher. The term "pass" used herein means to indicate that a quality problem, if any, occurred to a can is negligible. That is to say, with a compression force applied in the long-axis direction, flames or fire were created, heating the can, resulting in a problem of electrolyte leakage occurred to the can, which may insignificantly affect a state of the can.

First and second steps 127e and 128e are formed at the top end of the first wall portion 127b of the first narrow side wall 127 and the top end of the fourth wall portion 128c of the second narrow side wall 128, respectively. The cap assembly 130 is positioned on the first and second steps 127e and 128e.

The cap assembly 130 includes a cap plate 131, a gasket 132, an electrode terminal 133, an insulation plate 134, a terminal plate 135, and a plug 137. The cap plate 131 of the cap assembly 130 is positioned on the two steps 127e and 128e formed at the top end of the side wall 124 of the can 120 to be installed at the top opening of the can 120 and is fixed through welding.

The cap plate 131 has a terminal through-hole 131a and an electrolyte injection hole 131b. The terminal through-hole 131a provides a passage through which the electrode terminal 133 is inserted. Then, the electrode terminal 133 is inserted into the terminal through-hole 131a with a gasket being assembled on the side wall in order to insulate the metal cap plate 131 from the metal electrode terminal 133. Meanwhile, the electrolyte injection hole 131b through which an electrolyte is injected into the can 120 is formed on one side of the cap plate 131 and the electrolyte injection hole 131b is sealed by the plug 137 after the electrolyte is injected through the electrolyte injection hole 131b in order to prevent leakage of the electrolyte.

The insulation plate 134 is provided under the cap plate 131. The terminal plate 135 is provided under the insulation plate 134. Accordingly, the insulation plate 134 insulates the cap plate 131 from the terminal plate 135. The terminal plate 135 is coupled to the bottom end of the electrode terminal 133. Accordingly, the first electrode plate 111 of the electrode assembly 110 is electrically connected to the electrode terminal 133 through the first electrode tab 114 and the terminal plate 135. Then, the second electrode plate 112 of the electrode assembly 110 is electrically connected to the cap plate 131 or the can 120 through the second electrode tab 115.

The plug 137 is used to seal the electrolyte injection hole 131b after an electrolyte is injected through the electrolyte injection hole 131b formed in the cap plate 131, and a ball may be pressed into the electrolyte injection hole 131b to seal the electrolyte injection hole 131b in addition to the plug 137.

The insulation case 140 is provided under the terminal plate 135. The insulation case 140 has a first electrode tab through-hole 141 through which the first electrode tab 114 is withdrawn, a second electrode tab through-hole 142 through which the second electrode tab 115 is withdrawn, and an electrolyte injection hole 143. The insulation case 140 electrically insulates the electrode assembly 110 from the cap assembly 130.

Hereinafter, a can 220 of a secondary battery according to another exemplary embodiment of the present invention will be described.

Figure 6:
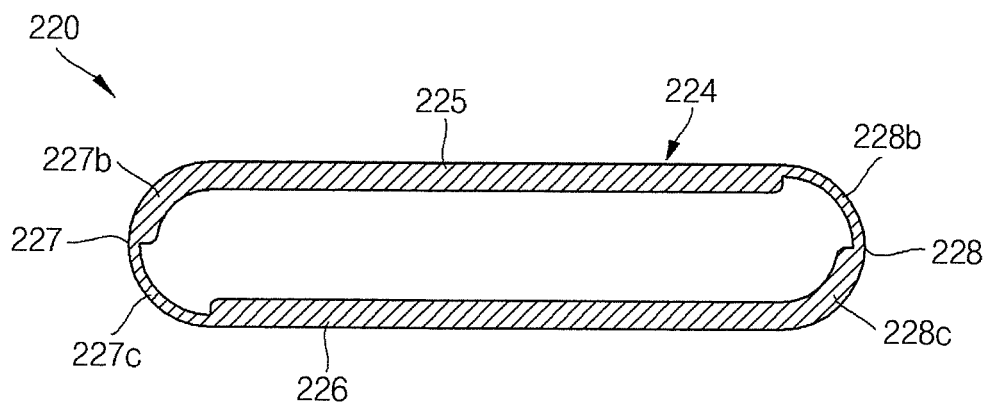
FIG. 6 is a sectional view of a can of a secondary battery according to another exemplary embodiment of the present invention viewed from the top.

FIG. 6 is a sectional view of the can 220 of a secondary battery according to one exemplary embodiment of the present invention.

Referring to FIG. 6, the side wall 224 of the can 220 includes first and second wide side walls 225 and 226 facing each other and first and second narrow side walls 227 and 228 facing each other and having a width narrower than that of the two wide side walls 225 and 226. The two narrow side walls 227 and 228 are connected to the two wide side walls 225 and 226. The two narrow side walls 227 and 228 are rounded such that the centers thereof protrude outward.

The first narrow side wall 227 has a first wall portion 227b closer to the first wide side wall 225 and a second wall portion 227c closer to the second wide side wall 226. At least one portion of the first wall portion 227b and the inner surface of the first wide side wall 225 protrude inward and are thicker than the second wall portion 227c. The second narrow side wall 228 has a third wall portion 228b closer to the first wide side wall 225 and a fourth wall portion 228c closer to the second wide side wall 226. At least one portion of the fourth wall portion 228c and the inner surface of the second wide side wall 226 protrude inward and are thicker than the third wall portion 228b. Since the first wide side wall 225 and the second wide side wall 226 as well as the first wall portion 227b and the fourth wall portion 228c are thicker than the second wall portion 227c and the third wall portion 228b, the can 220 avoids or resists longitudinal compression more easily due to its reinforced structure. Other aspects of the structure and operation of the can 220 are the same or similar as the embodiment illustrated in FIGS. 1 to 5, and a detailed description thereof will be omitted.

Hereinafter, a can 320 of a secondary battery according to another exemplary embodiment of the present invention will be described.

Figure 7:
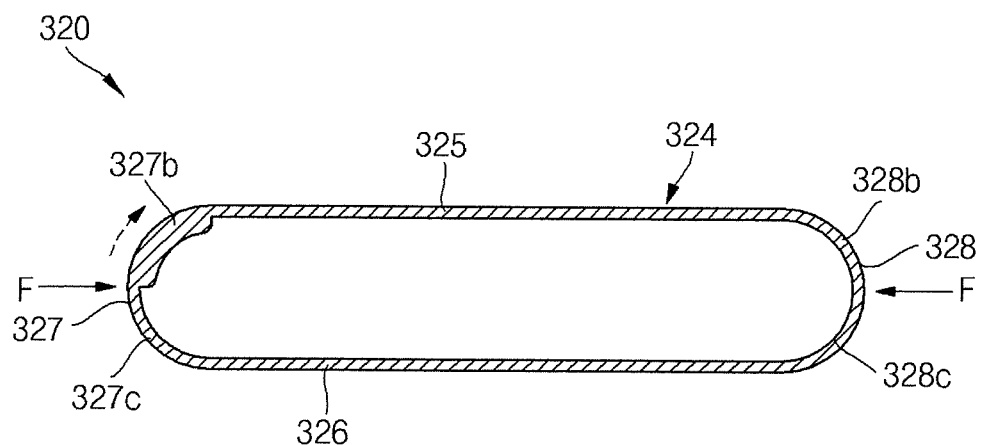
FIG. 7 is a sectional view of a can of a secondary battery according to yet another exemplary embodiment of the present invention viewed from the top.

FIG. 7 is a sectional view of the can 320 of a secondary battery according to one exemplary embodiment of the present invention.

Referring to FIG. 7, the side wall 324 of the can 320 includes first and second wide side walls 325 and 326 facing each other and first and second narrow side walls 327 and 328 facing each other and having a width narrower than that of the two wide side walls 325 and 326. The two narrow side walls 327 and 328 are connected to the two wide side walls 325 and 326. The two narrow side walls 327 and 328 are rounded such that the centers thereof protrude outward.

The first narrow side wall 327 has a first wall portion 327b closer to the first wide side wall 325 and a second wall portion 327c closer to the second wide side wall 326. At least one portion of the inner surface of the first wall portion 327b protrudes inward such that it is thicker than the second wall portion 327c. The first wide side wall 325, the second wide side wall 326, and the second narrow side wall 328 have substantially the same thickness as that of the second wall portion 327c.

Since the first wall portion 327b is thicker than the second wall portion 327c, the first wall portion 327b is structurally reinforced as compared with the second wall portion 327c. Accordingly, when a longitudinally compressive force F is applied, a greater force, or stress, is applied to the second wall portion 327c than to the first wall portion 327b of the first narrow side wall 327. The unbalance of the force rotates the can 320 in the direction of the dotted arrow of FIG. 7. Accordingly, the can 320 avoids or resists the longitudinal compression, thereby enhancing safety. Other aspects of the structure and operation of the can 320 are the same or similar as the embodiment illustrated in FIGS. 1 to 5, and a detailed description thereof will be omitted.

Hereinafter, a can 420 of a secondary battery according to another exemplary embodiment of the present invention will be described.

Figure 8:
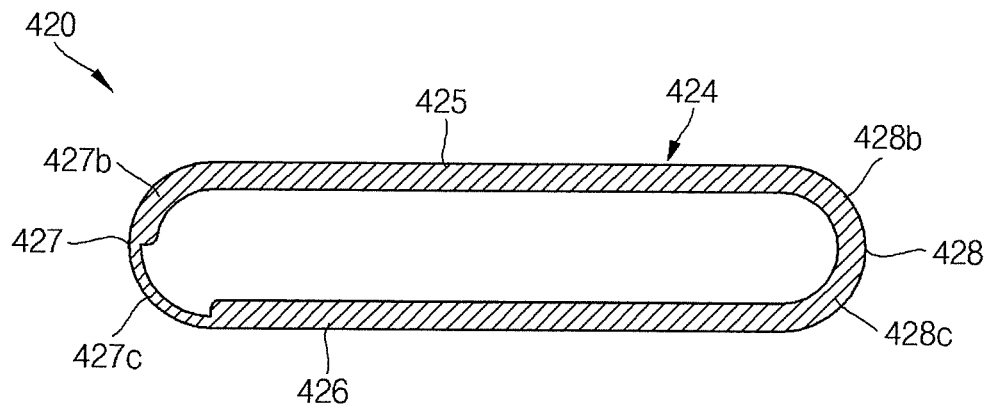
FIG. 8 is a sectional view of a can of a secondary battery according to still another exemplary embodiment of the present invention viewed from the top.

FIG. 8 is a sectional view of the can 420 of the secondary battery according to one exemplary embodiment of the present invention.

Referring to FIG. 8, the side wall 424 of the can 420 includes first and second wide side walls 425 and 426 facing each other and first and second narrow side walls 427 and 428 facing each other and having a width narrower than that of the two wide side walls 425 and 426. The two narrow side walls 427 and 428 are connected to the two wide side walls 425 and 426. The two narrow side walls 427 and 428 are rounded such that the centers thereof protrude outward.

The first narrow side wall 427 has a first wall portion 427b closer to the first wide side wall 425 and a second wall portion 427c closer to the second wide side wall 426. The first wall portion 427b, the first wide side wall 425, the second wide side wall 426, and the second narrow side wall 428 have substantially the same thickness. The first wall portion 427b is thicker than the second wall portion 427c.

Since the first wall portion 427b is thicker than the second wall portion 427c, the first wall portion 427b is structurally reinforced as compared with the second wall portion 427c. Accordingly, when a longitudinally compressive force F is applied, a greater force, or stress, is applied to the second wall portion 427c than to the first wall portion 427b of the first narrow side wall 427. The unbalance of the force allows the can 420 to avoid or resist the longitudinal compression, thereby enhancing safety. Other aspects of the structure and operation of the can 420 are the same or similar as the embodiment illustrated in FIGS. 1 to 5, and a detailed description thereof will be omitted.

Hereinafter, a can 520 of a secondary battery according to another exemplary embodiment of the present invention will be described.

Figure 9:
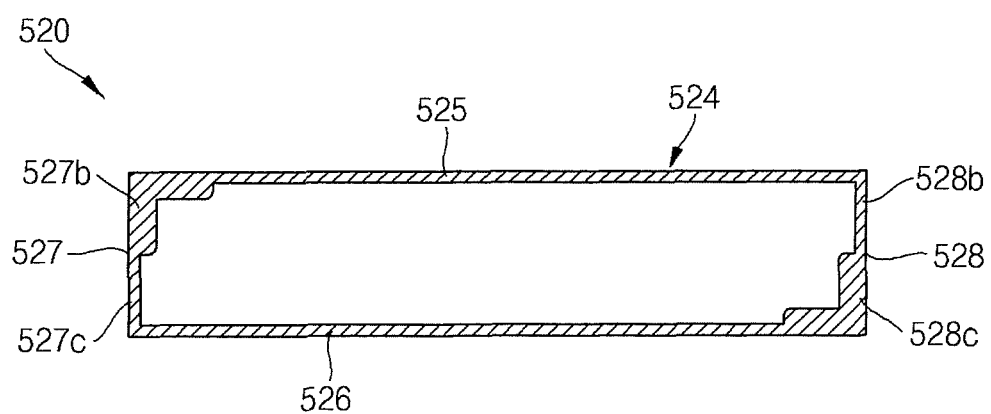
FIG. 9 is a sectional view of a can of a secondary battery according to still another exemplary embodiment of the present invention viewed from the top.

FIG. 9 is a sectional view of the can 520 of the secondary battery according to one exemplary embodiment of the present invention.

Referring to FIG. 9, the side wall 524 of the can 520 includes first and second wide side walls 525 and 526 facing each other and first and second narrow side walls 527 and 528 facing each other and having a width narrower than that of the two wide side walls 525 and 526. The two narrow side walls 527 and 528 are connected to the two wide side walls 525 and 526. The two narrow side walls 527 and 528 are substantially perpendicular to the two wide side walls 525 and 526 and are substantially flat.

The first narrow side wall 527 has a first wall portion 527b closer to the first wide side wall 525 and a second wall portion 527c closer to the second wide side wall 526. At least one portion of the inner wall of the first wall portion 527b protrudes inward, the first wall portion 527b and the second wall portion 527c being different in thickness. The thickness of the second wall portion 527c is substantially the same as that of the second wide side wall 526. The first narrow side wall 528 has a third wall portion 528b closer to the first wide side wall 525 and a fourth wall portion 528c closer to the second wide side wall 526. At least one portion of the inner wall of the fourth wall portion 528c protrudes inward, the third wall portion 528b and the fourth wall portion 528c being different in thickness. The thickness of the third wall portion 528b is substantially the same as that of the first wide side wall 525.

Since the first wall portion 527b is thicker than the second wall portion 527c, the first wall portion 527b is structurally reinforced as compared with the second wall portion 527c. Since the fourth wall portion 528c is thicker than the third wall portion 528b, the fourth wall portion 528c is structurally reinforced as compared with the third wall portion 528b. Accordingly, when a longitudinally compressive force F is applied, a greater force, or stress, is applied to the second wall portion 527c that to the first wall portion 527b of the first narrow wall 527 and a greater force, or stress, is applied to the third wall portion 528b than to the fourth wall portion 528c of the second narrow wall 528. The unbalance of the forces twists the can 520, thereby enhancing safety. Other aspects of the structure and operation of the can 520 are the same or similar as the embodiment illustrated in FIGS. 1 to 5, and a detailed description thereof will be omitted.

Although embodiments of the present invention have been described in detail herein, it should be understood that many variations and modifications of the basic inventive concept herein described fall within the spirit and scope of the present invention as defined in the appended claims.

What is claimed is:

1. A secondary battery comprising:
   an electrode assembly;
   a can containing the electrode assembly and comprising:
      a plate; and
      a wall extending from the plate in a first direction to define a cavity and an opening opposite the plate; and
   a cap assembly sealing the electrode assembly in the can,
   wherein the wall comprises first and second walls that face each other, and third and fourth walls that face each other, each of the third and fourth walls connecting the first and second walls to each other,
   an area of the first and second walls being larger than an area of the third and fourth walls, and
   wherein the third wall comprises a first corner portion of the wall proximate the first wall and a third corner portion of the wall proximate the second wall, and the fourth wall comprises a second corner portion of the wall proximate the second wall and a fourth corner portion of the wall proximate the first wall, a portion of the wall comprising the first and second walls and the first and second corner portions being thicker than another portion of the wall comprising the third and fourth corner portions.

2. The secondary battery of claim 1, wherein each of the first and second walls has a planar shape, and each of the third and fourth walls has a convex shape or a planar shape.

3. The secondary battery of claim 1, wherein the thicker portion of the wall comprises a portion of the wall protruding inward toward the cavity.

4. The secondary battery of claim 3, wherein the protruding portion of the wall has at least one rounded edge.

5. The secondary battery of claim 1, wherein a difference between a thickness of the thicker portion of the wall and a thickness of the another portion of the wall is at least 0.05 mm.

6. The secondary battery of claim 1, wherein the thicker portion of the wall extends in the first direction from the plate to an end proximate the opening.

7. The secondary battery of claim 1, wherein the wall comprises a stepped portion at an end of the thicker portion of the wall proximate the opening, and the cap assembly is coupled to the can on the stepped portion.

* * * * *